US011148346B2

(12) United States Patent
Vantrease

(10) Patent No.: US 11,148,346 B2
(45) Date of Patent: Oct. 19, 2021

(54) THERMOFORMING MACHINE AND METHOD

(71) Applicant: Irwin Research and Development, Inc., Yakima, WA (US)

(72) Inventor: Dale L. Vantrease, Naches, WA (US)

(73) Assignee: Irwin Research and Development, Inc., Yakima, WA (US)

(*) Notice: Subject to any disclaimer, the term of this patent is extended or adjusted under 35 U.S.C. 154(b) by 144 days.

(21) Appl. No.: 16/393,757

(22) Filed: Apr. 24, 2019

(65) Prior Publication Data
US 2019/0329484 A1    Oct. 31, 2019

Related U.S. Application Data

(60) Provisional application No. 62/662,694, filed on Apr. 25, 2018.

(51) Int. Cl.
| *B29C 51/46* | (2006.01) |
| *B29C 65/00* | (2006.01) |
| *B29K 105/00* | (2006.01) |
| *B29C 51/42* | (2006.01) |
| *B29C 65/78* | (2006.01) |
| *B29C 51/26* | (2006.01) |

(52) U.S. Cl.
CPC .......... *B29C 51/46* (2013.01); *B29C 66/0242* (2013.01); *B29C 51/267* (2013.01); *B29C 51/421* (2013.01); *B29C 65/7879* (2013.01); *B29K 2105/256* (2013.01)

(58) Field of Classification Search
CPC ..... B29C 51/267; B29C 51/38; B29C 51/421; B29C 51/428; B29C 51/46; B29C 65/7879; B29C 66/0242; B29K 2105/256; B30B 1/26; B30B 15/34
See application file for complete search history.

(56) References Cited

U.S. PATENT DOCUMENTS

| 3,677,675 A | 7/1972 | Brown |
| 4,878,826 A | 11/1989 | Wendt |
| 5,002,479 A | 3/1991 | Brown |
| 5,385,465 A | 1/1995 | Greiwe et al. |
| 6,055,904 A | 5/2000 | Chun et al. |
| 8,356,990 B2 | 1/2013 | Keeley |
| 8,790,108 B2 | 7/2014 | Lakatos |
| 2003/0090041 A1 | 5/2003 | Nemeskeri |
| 2004/0250709 A1 | 12/2004 | Schlepp |
| 2013/0049242 A1 | 2/2013 | Vantrease |
| 2013/0119584 A1 | 5/2013 | Vantrease |
| 2017/0080629 A1 | 3/2017 | Vantrease |

FOREIGN PATENT DOCUMENTS

| DE | 2900901 | 7/1980 |
| WO | PCT/US2019/028181 | 8/2019 |

*Primary Examiner* — Robert J Grun
(74) *Attorney, Agent, or Firm* — Keith D. Grzelak; Wells St. John P.S.

(57) ABSTRACT

A thermoforming machine is provided having at least one frame member and a thermal regulator. The thermal regulator is provided in heat transfer relation with one of the at least one frame member configured to control temperature of the one frame member to mitigate thermal deformation of the frame member. A method is also provided.

19 Claims, 16 Drawing Sheets

EXIT SIDE

THERMOFORMING MACHINE AND METHOD

CROSS REFERENCE TO RELATED APPLICATION

This application claims priority to U.S. Provisional Patent Application Ser. No. 62/662,694 which was filed on Apr. 25, 2018, the entirety of which is incorporated by reference herein.

TECHNICAL FIELD

The disclosure pertains generally to thermoforming apparatus. More particularly, this disclosure relates to thermoforming machines having thermal regulators to stabilize geometric changes to the frame and machine components, such as from thermally induced changes and/or tool wear and tolerance variations.

BACKGROUND OF THE DISCLOSURE

The use of large tonnage thermoforming frames and drive mechanisms is known in environments where one side of a thermoforming machine is subjected to a heat source while another side is not, such as an adjacent thermoforming oven. This can cause mating die plates to engage and not be parallel which is especially a problem because air pressure and/or vacuum is used when forming between mating die plates and seal integrity is important. Furthermore, tool wear and/or tolerance variations can cause non-parallel mating die pairs which need to be made parallel in order to operate effectively. Uneven heat across a frame can cause geometric changes across the frame that can lead to poor fit-up between engaging die plates on platens. Furthermore, changes in temperature within a thermoforming plant can lead to changes in frame dimensions and geometry that impact precision engagement of forming surfaces between to engaging die plates between platens during a forming operation. Improvements are needed in order to enable thermal balancing and/or stabilization of frame components on a thermoforming machine to mitigate forming problems resulting from thermally induced dimensional changes, tool wear and/or tolerance variations on components of a thermoforming machine.

One problem caused by thermally induced changes in a frame is tooling surface mismatch that causes the contact surfaces of adjacent die plates to deform and mismatch or not close completely. There exists a need to stabilize thermally induced structural changes in components and frames of a thermoforming machine.

Other aspects and implementations are contemplated.

SUMMARY OF THE INVENTION

A thermoforming machine is provided with a thermal regulator for one or more frame members. The thermoforming machine can have a cooling unit, a heating unit, or both a cooling unit and a heating unit on one or more structural members of a frame along with a valve and control system that monitors flow of coolant to stabilize structural geometry of the frame.

According to one aspect, a thermoforming machine is provided having at least one frame member and a thermal regulator. The thermal regulator is provided in heat transfer relation with one of the at least one frame member configured to control temperature of the one frame member to mitigate thermal deformation of the frame member.

According to another aspect, a thermoforming machine is provided having a frame and a thermal regulator. The frame has a plurality of spaced-apart frames members. The thermal regulator is provided in heat transfer relation with one of the plurality of frame members configured to control temperature of the one frame member of a pair of spaced-apart frame members to mitigate thermal deformation of the frame member between the pair of frame members.

According to yet another aspect, a method of mitigating non-parallel die mating in a thermoforming machine is provided. The method includes: providing a frame having a plurality of spaced-apart frame members configured to carry a pair of reciprocating platens and mating dies; realizing a non-parallel die closing state between the dies and platens; and one of: a) heating and b) cooling one of the two pair of frame members to mitigate the non-uniform die closing state by imparting a non-symmetric thermal input between the pair of frame members that imparts a thermal dimension change that mitigates the non-parallel die closing state.

BRIEF DESCRIPTION OF THE DRAWINGS

Exemplary embodiments of the various disclosures are described below with reference to the following accompanying drawings. The drawings may be considered to represent scale.

DETAILED DESCRIPTION OF THE EMBODIMENTS

This disclosure is submitted in furtherance of the constitutional purposes of the U.S. Patent Laws "to promote the progress of science and useful arts" (Article 1, Section 8).

Figure 1:
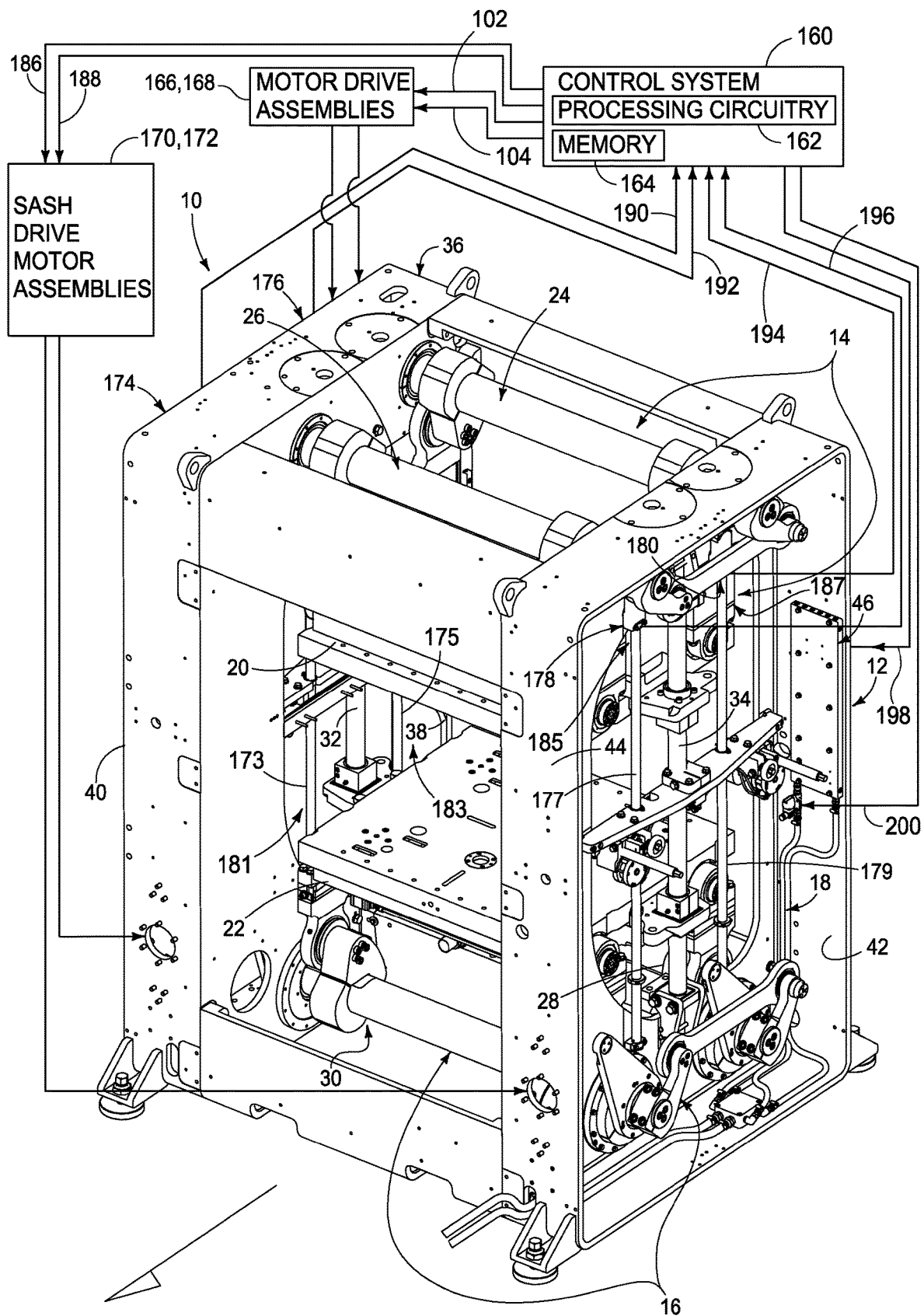
FIG. 1 is a right upstream end perspective view from above of a thermoforming machine having a differential load source with a Servo Actuated Shut Height (SASH) and platens having tooling support plates with discrete load paths and a control system.

FIG. 1 illustrates one suitable construction for a thermoforming machine 10 having an upper platen 20 and a lower platen 22 carried within a frame 36 having a pair of thermal regulators 12 provided on opposite sides of the frame adjacent a side that is next to an oven in a thermoforming line. The oven generates heating of the adjacent side of frame 36, necessitating cooling in order to minimize or eliminate thermally induced structural warping, or deformation to frame 36. Although not shown, it is understood that conveyor rails pass completely through thermoforming machine 10 for conveying a heated sheet of thermoformable material there through during a forming operation from an upstream end on the left to a downstream end on the right. Thermoforming machine 10 has a differential load source, or Servo Actuated Shut Height (SASH) mechanism (not shown) acting through a SASH drive linkage assembly 18 that imparts an upward differential load to raise and lower platen 22 when platens 20 and 22 are closed together during a forming operation using an eccentric bearing assembly (not shown). An upper platen drive assembly 14 cyclically drives upper platen 20 down and up while a lower platen drive assembly 16 drives lower platen 22 up and down in synchronization within a rigid steel frame 36. Upper platen drive assembly 14 has a servo motor that is configured to drive an upper gear box that drives a cross shaft to reciprocate toggle shafts 28 and 30 via toggle arms 50 on upper platen drive assembly 24 via reciprocation of platen drive toggle shafts 24 and 26 to lower and raise upper platen 20. Upper platen drive assembly 14 includes a crank arm, a drive arm or link, a connecting link or follower arm, and crank arms, and four connecting rods, or drive arms driven up and down via reciprocating (rotating to and fro) toggle shafts 24 and 26. Drive arms carried by shafts 24 and 26 each include a toggle bearing and a platen bearing at opposed ends.

Likewise, a lower platen drive assembly 16 is configured with a servo motor to drive a lower gear box that drives a cross shaft to reciprocate lower platen drive assembly 16 which reciprocates platen drive toggle shafts 28 and 30 (see FIG. 2) via toggle arms to raise and lower platen 22. Lower platen drive assembly 16 includes a shaft crank arm, a drive arm or link, a connecting link or follower arm, and crank arms, and four connecting rods, or drive arms driven up and down via reciprocating (rotating to and fro) toggle shafts 28 and 30 (see FIG. 2). Drive arms each include a toggle bearing and a platen bearing at opposed ends.

In order to detect deformation of frame 36, a Linear Variable Differential Transformer (LVDT) sensor 174, 176, 178, and 180 is affixed atop a thermally stable, inelastic rod 173, 175, 177 and 179 housed freestanding and spaced apart from a stainless steel cylindrical tube extending between the two frame positions, or locations where rod 173, 175, 177 and 179 is affixed at a bottom location and sensor 174, 176, 178 and 180 is affixed at a top location in contact with a top surface of rod 173, 175, 177 and 179. Sensor 174, 176, 178 and 180 detects relative movement of adjacent frame legs of frame 64 from elastic deformation by measuring position of the top of each rod 173, 175, 177 and 179 relative to sensor 174, 176, 178 and 180. In one case, a stainless steel cap is provided, adhesively secured, atop rod 173, 175, 177 and 179 with a concavity for receiving a measuring tip on sensor 174, 176, 178 and 180. In one case, rod 173, 175, 177 and 179 is formed from a carbon fiber rod because carbon is substantially more thermally stable than materials (such as steel) used to form frame 36). In another case, a laser beam can be used to detect minute elastic (or plastic) deformation of each corner frame member of frame 64.

Sensors 174, 176, 178, and 180 of FIG. 1 generate an output signal 186 that is input to control system 192. In response to the detected and measured deformation of frame 36, control system 160 generates an output signal 186 and 188 to drive differential load source, or SASH 170, 172 to actuate right and left drive assemblies 170 and 172, together or independently. Input signals 186 and 188 to motor drive assemblies 170 and 172 impart rotation to eccentric cam assemblies on shafts 28 and 30 to raise lower toggle shafts relative to upper toggle shafts, thereby imparting, or applying a differential load, or force between die plate 22 and frame 36. This force is configured to impart a closing force, or closing differential displacement to die plate 22 towards die plate 20 sized to at least counteract structural separation between die plates 20 and 22 resulting from structural deformation from forming pressure between die plate 20 and die plate 22 during a forming operation. Furthermore, output signals 102 and 104 are generated from control system 160 to drive upper motor drive assembly 166 and lower drive assembly 168 at desired times. In one case, control system 160 sends signals 102 and 104 to close platens 20 and 22 and associated die plates (not shown) before signals 186 and 188 are sent to actuate SASH drive assemblies 170 and 172 to a level, or force that largely or completely counteracts the detected deformation of frame 36 from sensors 174, 176, 178 and 180 measuring relative motion with top end of rods 173, 175, 177 and 179 of sensing apparatus 174, 176, 178 and 180.

According to one construction, servo motor assemblies 170 and 172 each include a Siemens Servomotor (Model No. 1FT7108-5SC71-1BA0) available in the United States from Siemens Corporation, 300 New Jersey Avenue, Suite 1000, Washington, D.C. 20001 United States. Each servo motor assembly 170 and 172 includes an air brake such as a product no. D6C2K-003 Mach III spring engaged air release brake available from MACH III CLUTCH, INC., 101 Cummings Drive, Walton, Ky. 41094 United States. Gearbox 138 is a Wittenstein 20:1 Planetary Gearbox (Model No. SP240S-MF2-20) available in the United States from WITTENSTEIN holding Corp. 1249 Humbracht Circle, Bartlett, Ill.

Respective modern rotary electric servo drive motors 166 and 168 independently drive platen drive assemblies and platens 20 and 22, and die plates (not shown). Such motors are driven by a computer control system, as is presently understood in the art. Likewise, motor drive assemblies 170 and 172 are similarly constructed and controlled. Other kinematic linkages and drive motor arrangements can be used in the alternative. Such a drive includes an AC servo motor and an associated servo drive motor controller. For example, one suitable AC servo drive motor is a SIEMENS SERVO MOTOR W/ AS20DQI (1FT7108-5SC71-1BA0) sold by Siemens AG, Automation Group, Automation Systems for Machine Tools, Robots and Special—Purpose Machines, P.O. Box 31 AD, D—91050, Erlangen, Federal Republic of Germany and available in the United States at Siemens Corporation, 300 New Jersey Avenue, Suite 1000, Washington, D.C. 20001 United States. One suitable drive gearbox is a WITTENSTEIN SP+ SERIES PLANETARY GEARBOX—20:1 RATIO—W/ SIEMENS 1FT7108 ADAPTER (SP240S-MF2-20-1 FT7108).

Additionally, one suitable servo drive motor controller is sold by Siemens as a digital feed drive system including an S120 series SINAMICS servo drive controller. Other controllers can also be used. Such a drive will provide a predictable motor device that can very accurately position a machine element to a desired position at a given time. Accordingly, the associated servo motor is a brushless servo motor. Using suitable control software, activation of associated machine components can also be triggered based on velocity or position of a drive, by using a velocity profile or an integrated displacement of the drive.

Control system 160 of FIG. 1 includes processing circuitry 162 and memory 164 configured to receive input signals from sensors 174, 176, 178 and 180 indicative of frame dimensions that change (lengthen or shorten) responsive to thermally-induced deformations on frame legs of frame 36. In response to such input signals, control system 162 generates output control signals 198 and 200 to the frame member cooling units 46 and 48 (see FIG. 2) to control valves (such as outlet line valve 52 in FIG. 13) that enable controlled fluid flow through such respective cooling circuits of cooling units 46 and 48 to respectively cool frame legs 42 and 38 and mitigate or eliminate any differential length changes to frame legs 42 and 38 relative to frame legs 44 and 40 (see FIG. 3) caused by proximity of a heat source, or oven, to frame legs 38 and 42. Control system 160 also generates output signals to motor drive assemblies 166 and 168, as well as SASH drive motor assemblies 186 and 188. Accordingly, a non-symmetric thermal input to spaced-apart frame members can impart a non-uniform thermal deformation of the frame across any two pair of frame members. By either cooling (or heating) one of the two pair of frame members, the control system and cooling units can mitigate (or eliminate) the non-uniform thermal deformation by mitigating the non-symmetric thermal input between the pair of frame members.

Figure 9:
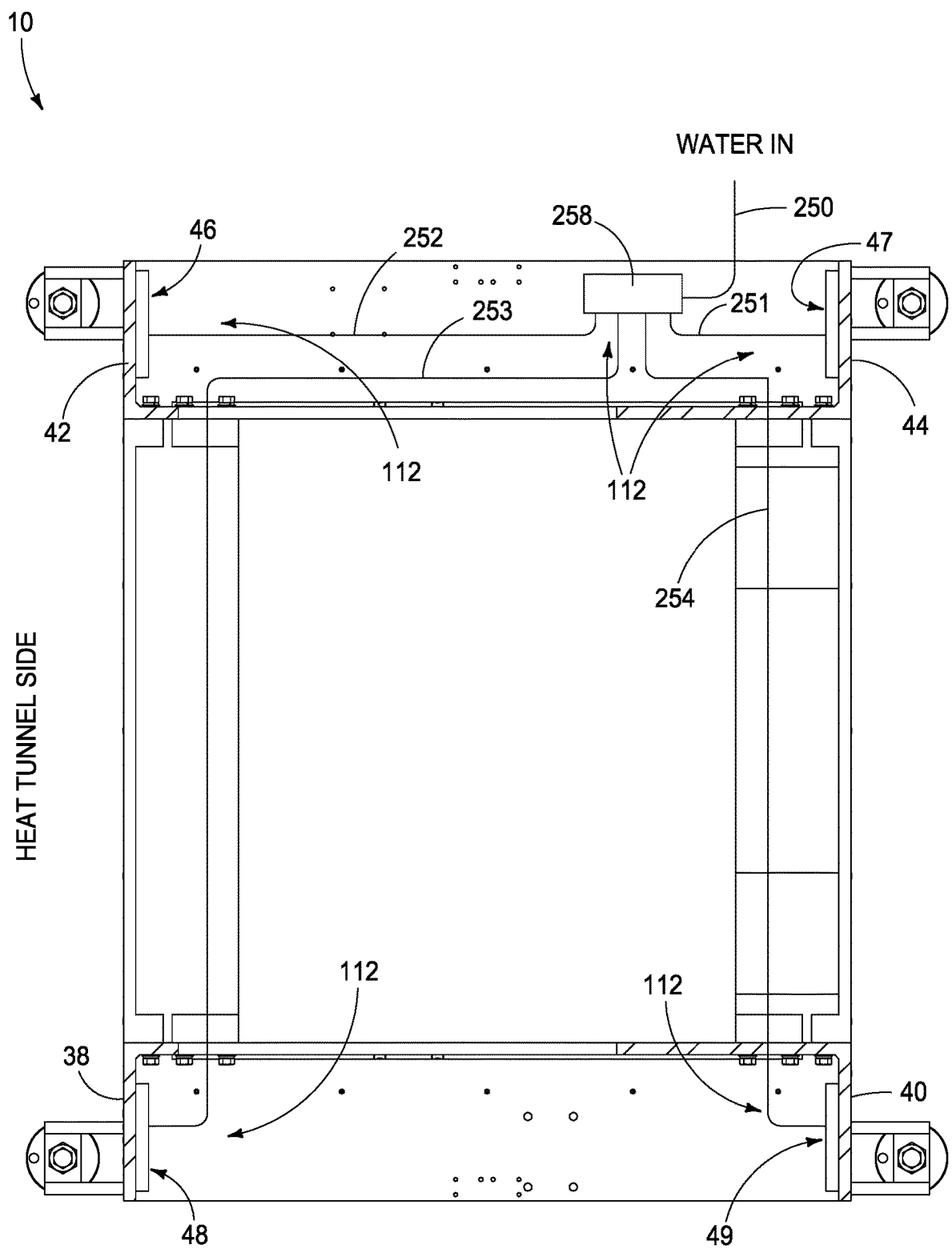
FIG. 9 a sectional view of the frame taken along line 9-9 of FIG. 5.

Optionally or additionally, control system 160 of thermoforming machine 10 can be used in an apparatus and method for adjusting dimensional changes resulting from tool or component wear or tolerances (out of speck) by inputting a non-symmetric thermal input to one or more of cooling/heating units 46, 47 and 48, 49 (see FIG. 9). In this way, control system 160 can impart a cancelling thermal deformation that cancels out any tolerance or wear difference detected across a platen or tool surface from side-to-side or front-to-back, or from corner-to-corner. Even further, if the sides of the frame are contiguous panel surfaces (and not discrete frame legs), spaced apart heating/cooling units can be used to counteract thermal deformation across the panel surface by heating or cooling one end of the surface relative to another end of the surface.

A pair of vertical die posts 32 and 34 guide platens 20 and 22 for vertical reciprocation via respective guide bushings provided on each side of platens 14 and 16, as shown in FIG. 1. The guide posts are removed from certain views below in order to facilitate viewing of other components of machine 10.

Figure 2:
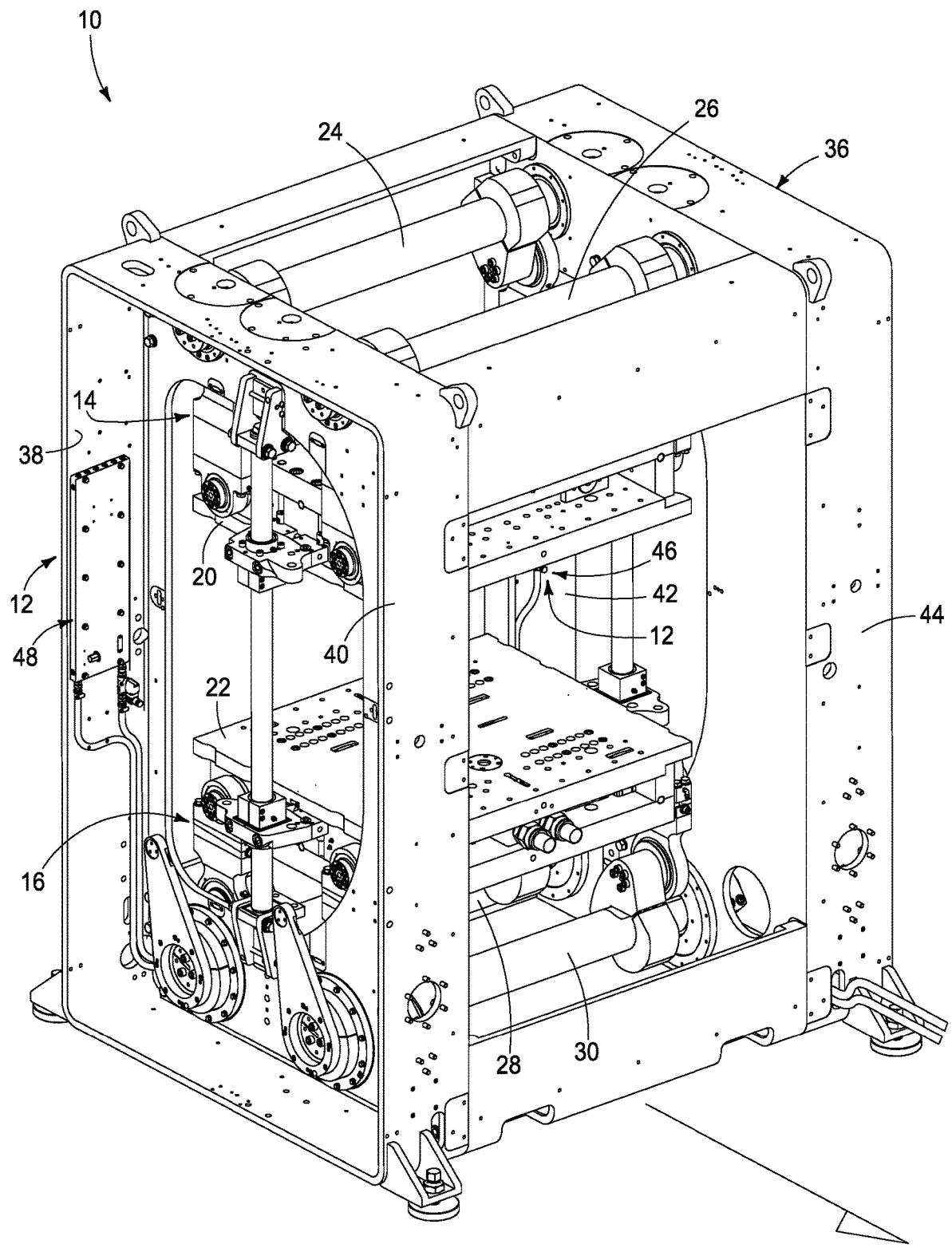
FIG. 2 is a left upstream end perspective view from above of a thermoforming machine having a differential load source with a Servo Actuated Shut Height (SASH) and platens having tooling support plates with discrete load paths.
Figure 3:
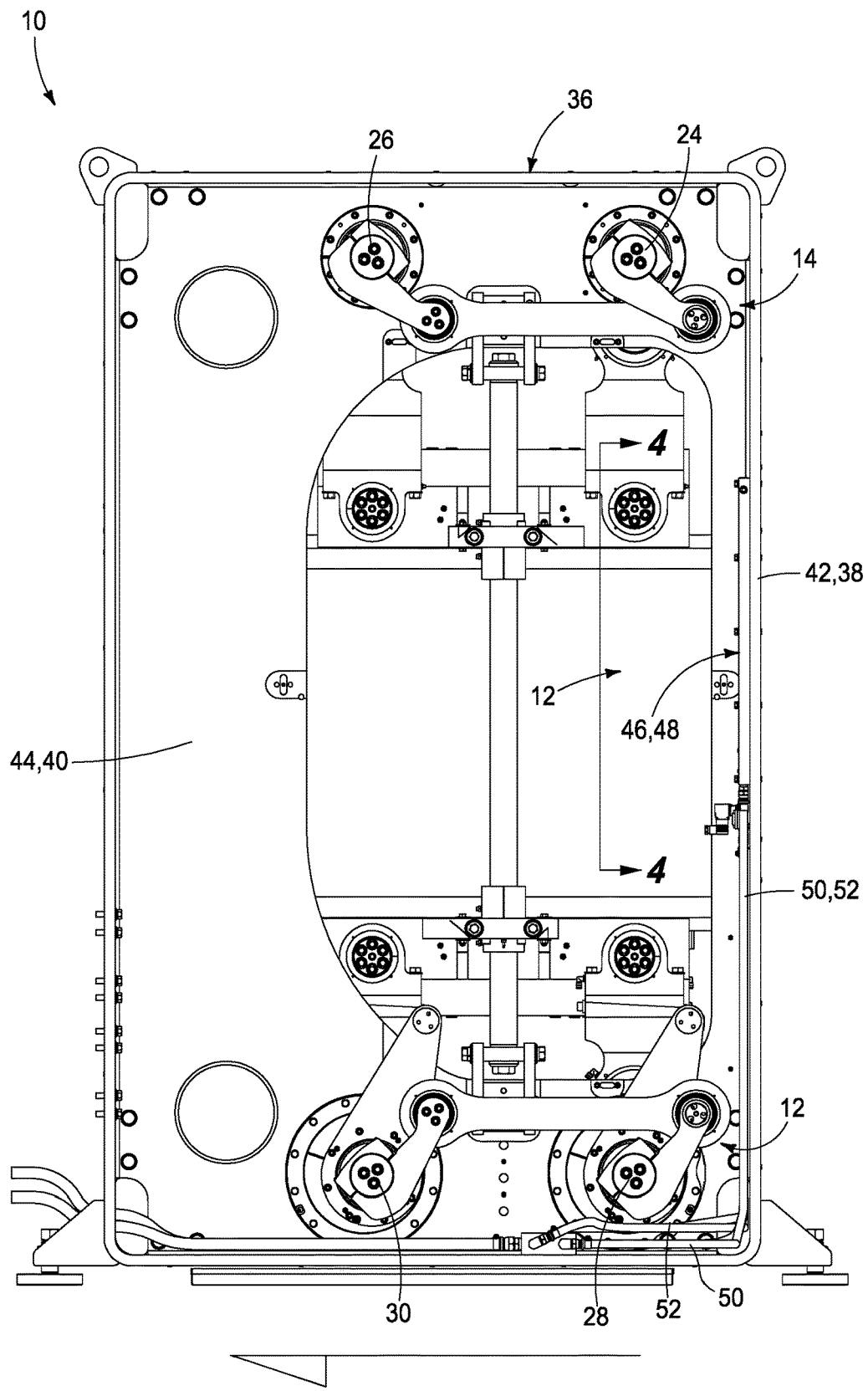
FIG. 3 is a left-side view of the thermoforming machine of FIG. 1 showing the platens in a closed position.

As shown in FIGS. 1-3, frame 36 includes four vertical steel corner posts, or legs 38, 40, 42, and 44. Thermal regulators 46 are provided on legs 38 and 42 because they are proximate a heat source, or oven in a thermoforming line (not shown). Thermal regulators 46 receive a flow of cooling fluid, or water to decrease temperature of legs 38 and 42 from such heating.

FIGS. 1-3 illustrate thermoforming machine 10 with top platen 20 and bottom platen 22 shown in a closed position carried for reciprocating motion by frame 36. Upper platen 20 includes a tooling support plate configured to support a die plate (not shown) with a plurality of female dies. Likewise, lower platen 22 includes a tooling support plate configured to support a die plate (not shown) with a plurality of complementary male dies, as is understood by one of ordinary skill in the art. The toggle links 24, 26 and 28, 30 (see FIGS. 1 and 2) oscillate to and fro to drive pivoting platen drive assemblies 14 and 16 and move platens 20 and 22 toward and away from each other.

As shown in FIGS. 1-3, platen 20 is formed as a compound structure having a leading tooling support plate and a trailing, or back plate. Likewise, platen 22 is formed as a compound structure having a leading tooling support plate and a trailing or back plate. The plates of platens 20 and 22 are coupled together with a plurality of discrete load paths interconnecting the tooling plate back surface with the back plate front surface operative to distribute and centralize load deformation of the tooling plate from tooling loads, the load paths provided laterally inboard of the tooling plate front tooling surface to impart discretized and/or localized deformation along the tooling plate front tooling surface. FIGS. 1, 2, 3 and 10 shows platens 20 and 22 closed inside frame 36.

Figure 4:
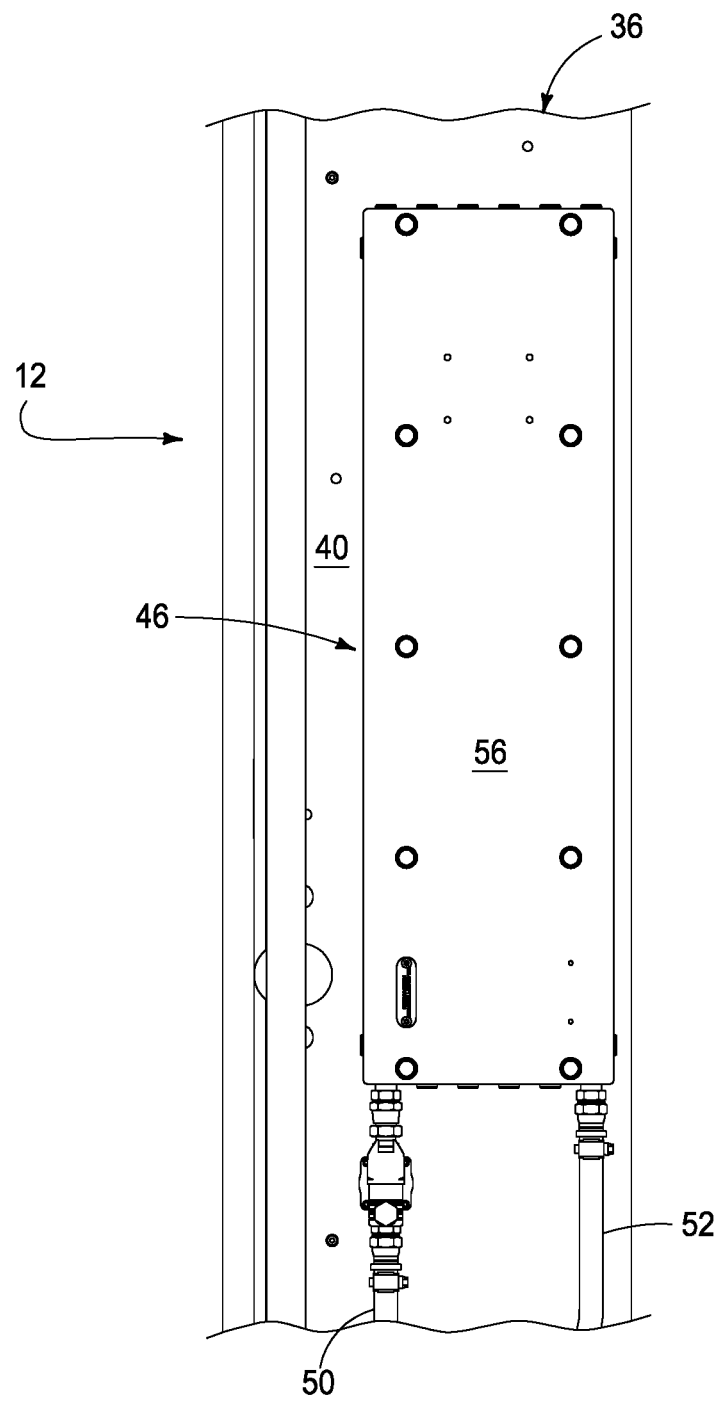
FIG. 4 is a vertical partial component view of a thermal regulator mounted to a component of the frame taken along line 4-4 of FIG. 3.

FIG. 4 is a vertical partial component view of a thermal regulator 12 mounted to a component of frame 36. More particularly, thermal regulator 12 is affixed in thermally conductive relation to a side surface 40 of frame 36. In one case, frame 36 is a thermally conductive steel frame with a steel side surface 40. In one case, thermal regulator 12 comprises a machined aluminum housing cooling unit, or cooler 46 having a sealed removable cover 56 and a U-shaped fluid conduit path 54 that allows fluid, or cooling water to enter via inlet line 52, past a controlled shutoff valve into conduit path 54 where it returns at a far end and exits via outlet line 54.

Figure 5:
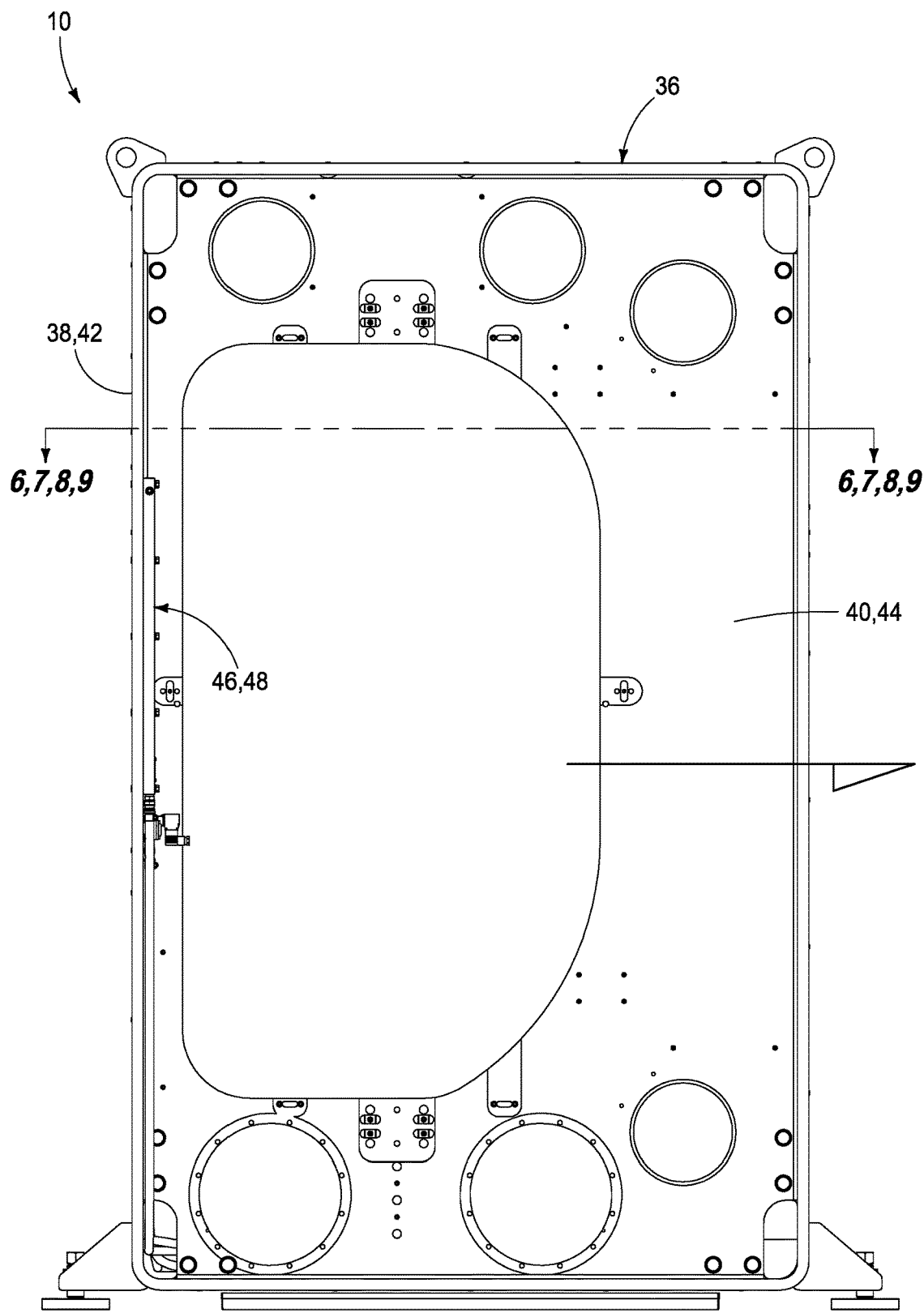
FIG. 5 is a left-side view of the thermoforming machine of FIG. 1 with platens and drive assemblies removed showing components of the structural frame.

FIG. 5 is a left-side view of the thermoforming machine 10 of FIG. 1 with platens and drive assemblies removed showing components of the structural frame 36 and arrangement of legs 38, 42 and 40, 44.

Figure 6:
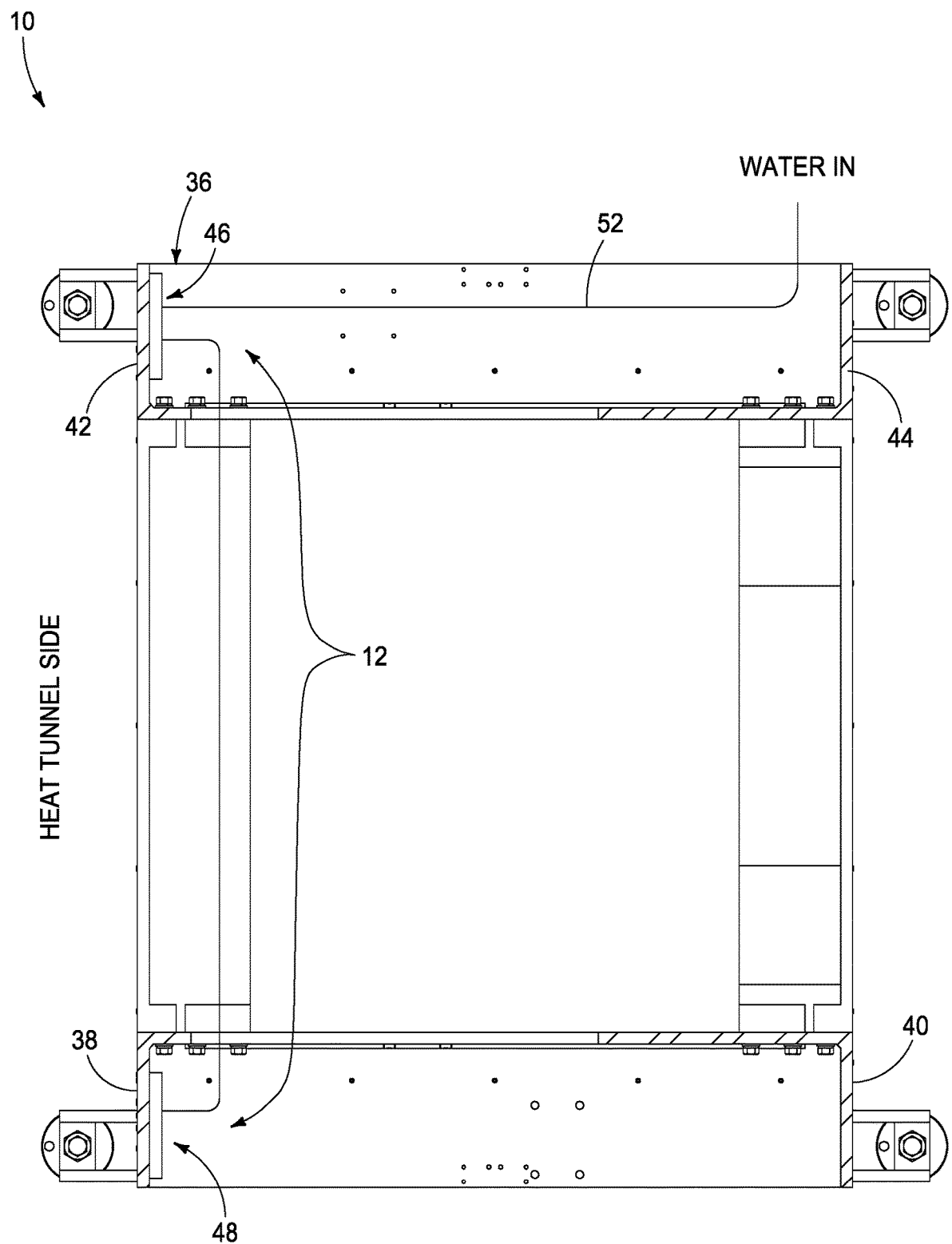
FIG. 6 a sectional view of the frame taken along line 6-6 of FIG. 5.

FIG. 6 a sectional view of the frame 36 of thermoforming machine 10 taken along line 6-6 of FIG. 5. More particularly, thermal regulator 12 is shown having a cooling fluid circuity line 52 feeding into a first cooling unit, or cooler 46 from a flowing fluid source followed by a second cooling unit, or cooler 48. Cooling unit 46 is affixed onto a face flange of leg 42 while cooling unit 48 is affixed onto a face flange of leg 38, in thermally conductive relation there between.

Figure 7:
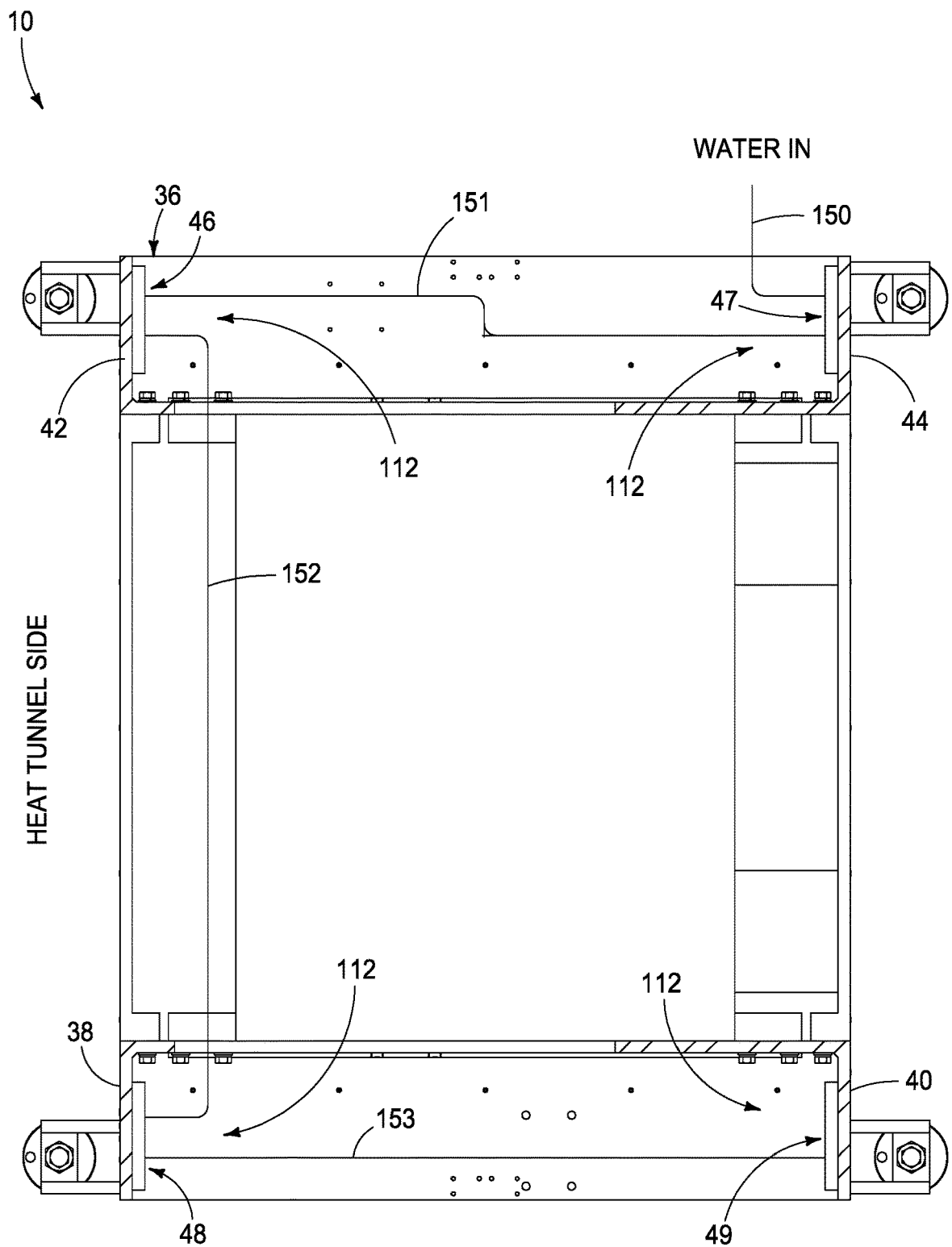
FIG. 7 a sectional view of the frame taken along line 7-7 of FIG. 5.

FIG. 7 a sectional view of the frame 36 of thermoforming machine 10 taken along line 7-7 of FIG. 5. More particularly, thermal regulator 112 is shown having a cooling fluid circuity line 152 feeding into a first cooling unit, or cooler 47 from a flowing fluid source line 150 followed by a second cooling unit, or cooler 46 which received fluid from cooler 47 via conduit 151. A third cooling unit 48 then received fluid via conduit 152 from cooler 46. Cooling fluid then leaves cooler via conduit 153 to final cooling unit 49. Cooling unit 46 is affixed onto a face flange of leg 42 while cooling unit 48 is affixed onto a face flange of leg 38, in thermally conductive relation there between. Cooling units 47, 46, 48, and 49 are affixed in thermally conductive relation onto steel faces of legs 44, 42, 38, and 40.

Figure 8:
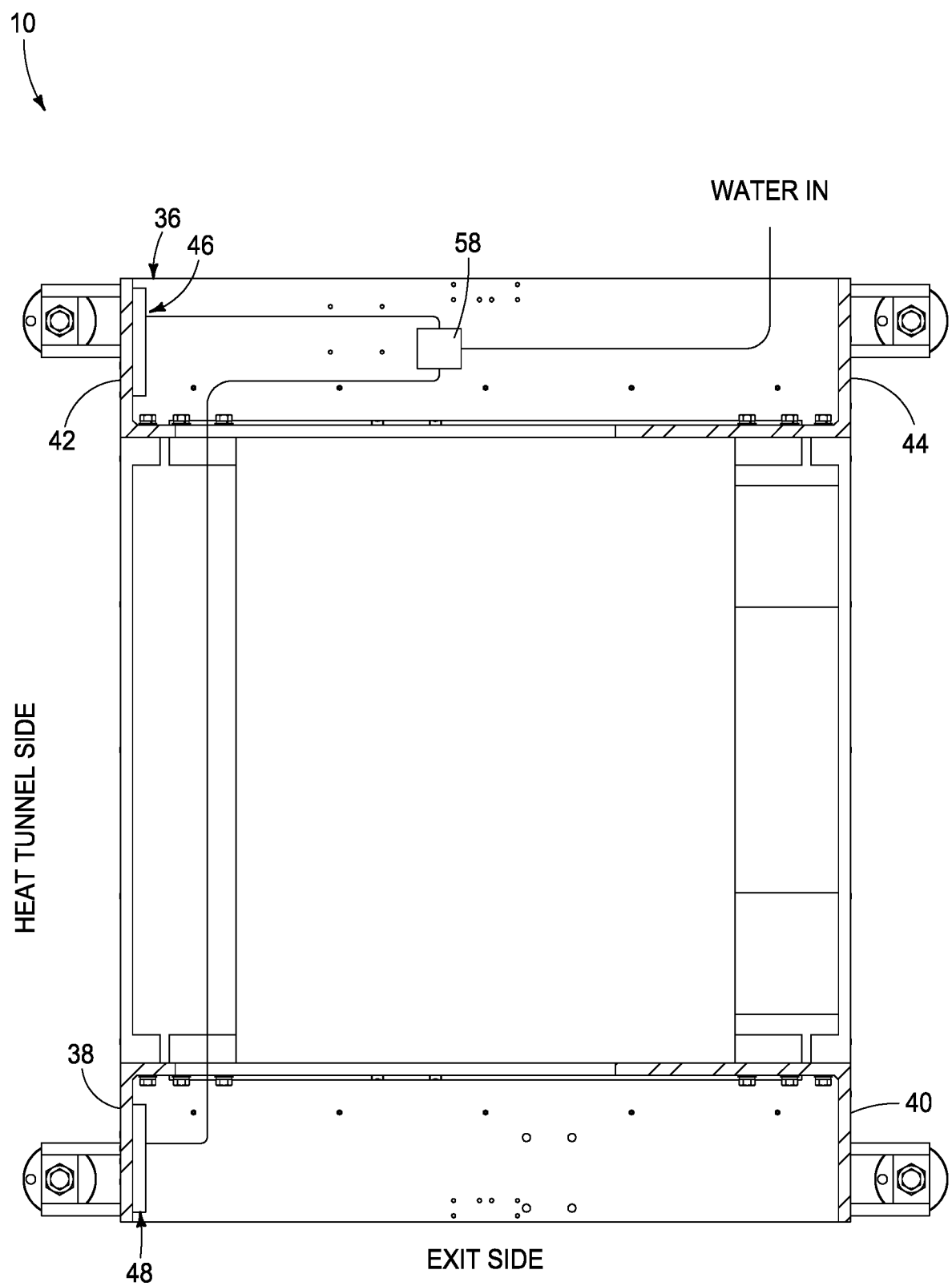
FIG. 8 a sectional view of the frame taken along line 8-8 of FIG. 5.

FIG. 8 a sectional view of the frame 36 of thermoforming machine 10 taken along line 8-8 of FIG. 5. More particularly, a thermal regulator is shown having a cooling fluid circuity line feeding into manifold 58 that splits into two conduits that feed in parallel to a pair of cooling units 46 and 48. Cooling unit 46 is affixed onto a face flange of leg 42 on frame 36 while cooling unit 48 is affixed onto a face flange of leg 38, in thermally conductive relation there between.

FIG. 9 a sectional view of the frame 36 of thermoforming machine 10 taken along line 9-9 of FIG. 5. More particularly, a thermal regulator 112 is shown having a cooling fluid circuity line 250 feeding into a manifold 258 that splits into two conduits 251 and 252 that feed in parallel to a pair of cooling units 46 and 47, on legs 42 and 44, respectively. Also in parallel, conduit lines 253 and 254 feed cooling units 48 and 49 in parallel on legs 38 and 40, respectively. Cooling unit 46 is affixed onto a face flange of leg 42 on frame 36 while cooling unit 48 is affixed onto a face flange of leg 38, in thermally conductive relation there between FIG. 10 is a right-side view of the thermoforming machine 10 of FIG. 1 showing the platens in a closed position and further showing a cooling unit 48 place onto leg 38 of frame 36 (as well as one placed on leg 42, but hidden from view).

Figure 11:
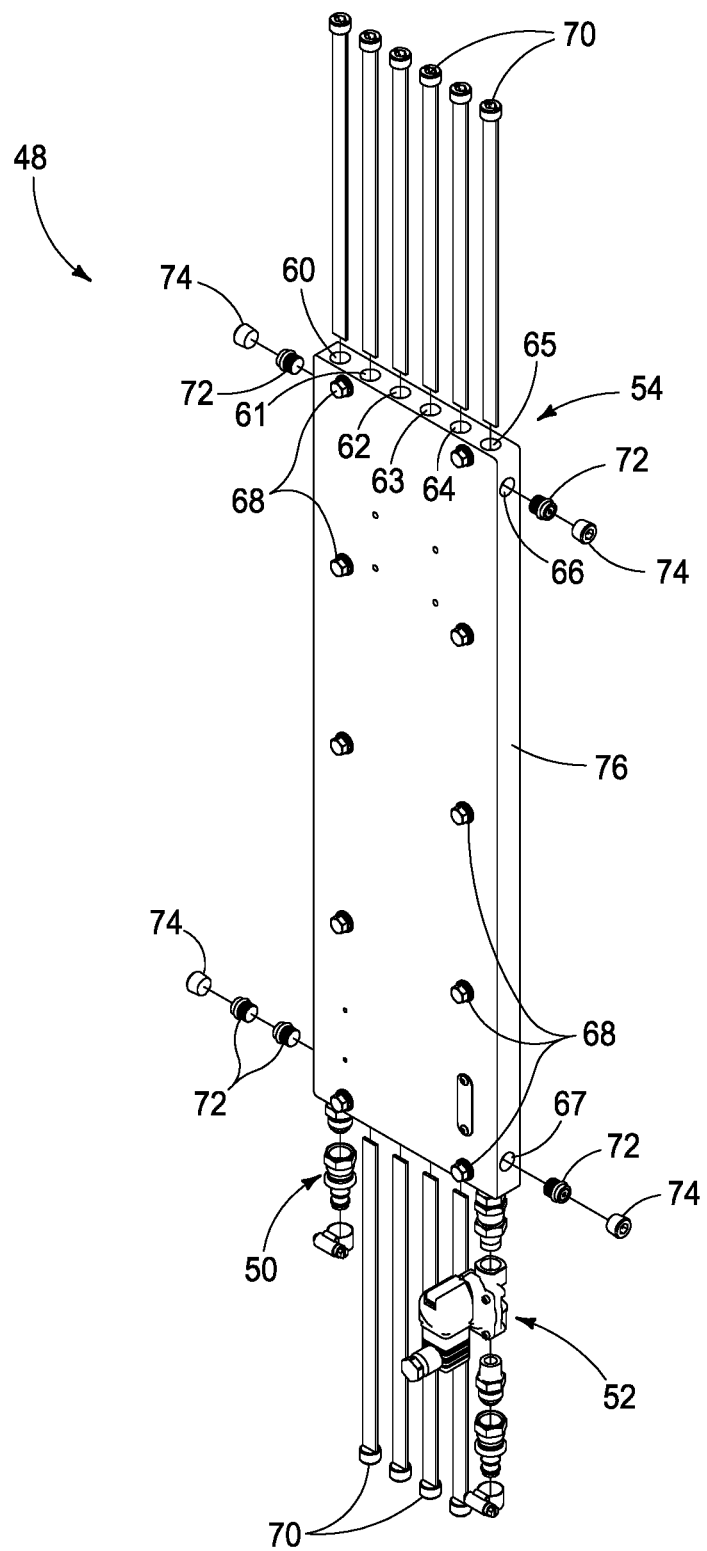
FIG. 11 is an exploded component perspective view of the thermal regulator of FIGS. 1-9.

FIG. 11 is an exploded component perspective view of the thermal regulator of FIGS. 1-9. A plurality of substantially parallel vertical cylindrical bores 60-65 are formed in a metal (or aluminum) thermally conductive cooler body 76 of cooling unit 48. Such bores 60-65 are connected at a top and bottom by a pair of horizontal bores 66 and 67. Inner flow plugs 72 are selectively threaded in place in sealed relation into threaded bores between adjacent vertical bores 60-65 within horizontal bores 66 and 67 to provide a circuitous vertical up and down flow path for a cooling circuit. Outer flow plugs 76 seal the circuit in threaded engagement with housing 76. An array of individual flow baffle plugs 70 are inserted into each vertical flow path 60-65 and are each configured to impart turbulent flow within the resulting circuitous flow path inside of housing 76. One suitable flow baffle plug is a Model No. PBF0375-12, available from DME Company, World Headquarters, 29111 Stephenson Highway, Madison Heights, Mich. 48071 United States. Other turbulence-inducing structures may also be used, such as any device having an undulating or flow disturbing surface, such as a thin strip having sinusoidal undulations that induce flow turbulence of cooling or heating fluids being pumped through the cooling (or heating) circuit within housing 76. Threaded fasteners 68 secure housing in thermally conductive relation to a thermoforming frame member. An inlet line connects at an inlet fitting 50 with the cooling circuit and an outlet line connects at an outlet fitting (valve) 52.

Figure 10:
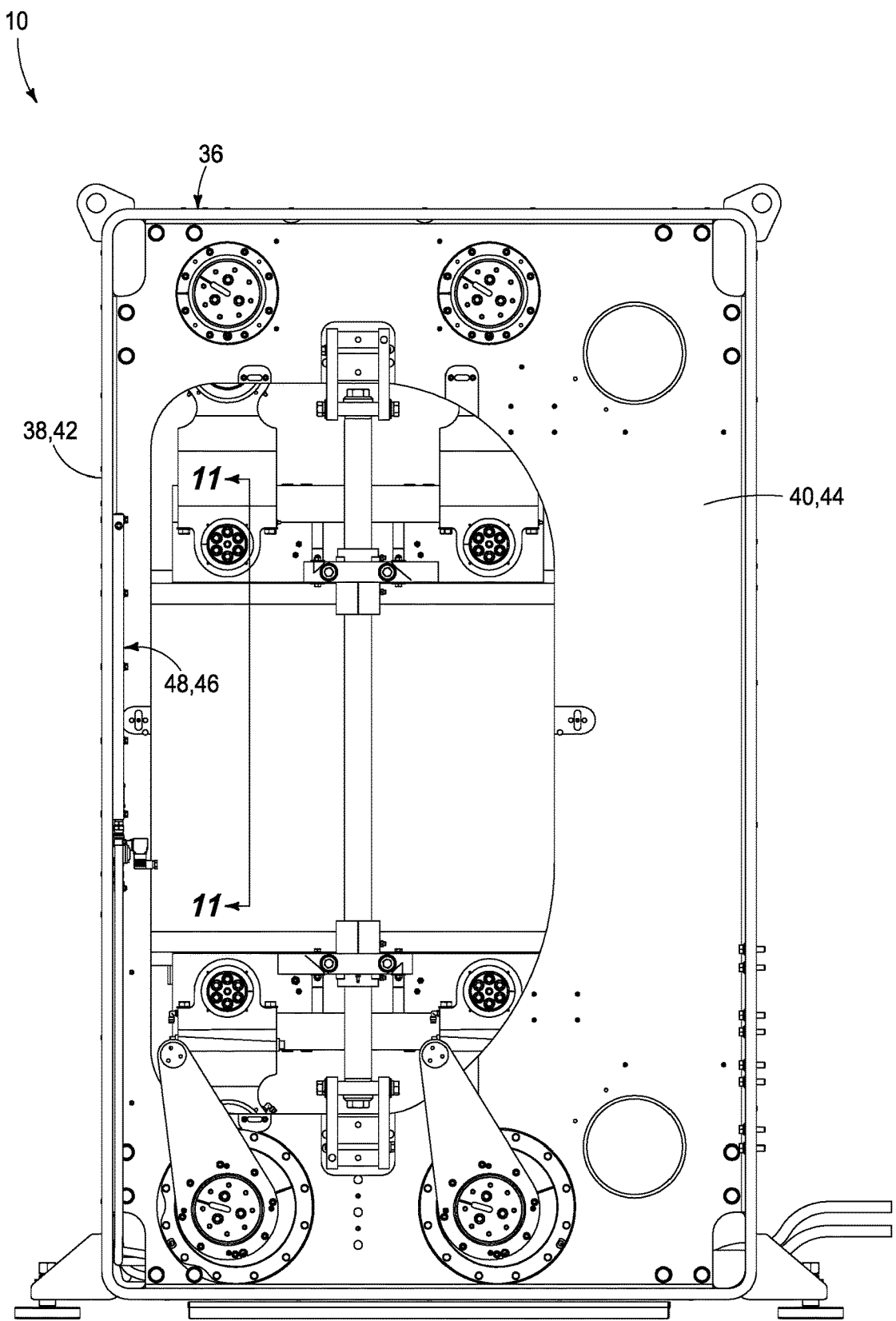
FIG. 10 is a right-side view of the thermoforming machine of FIG. 1 showing the platens in a closed position.
Figure 12:
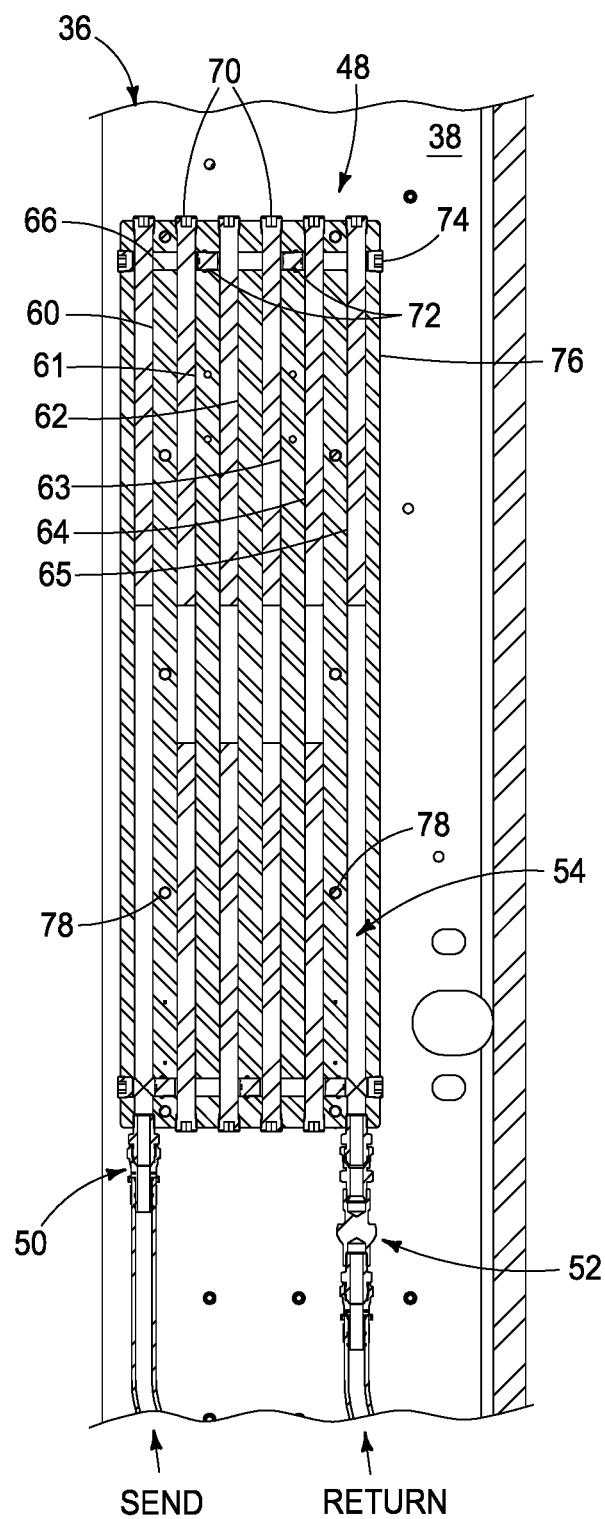
FIG. 12 is a vertical partial component sectional view of the thermal regulator of FIG. 10 taken along line 12-12 of FIG. 10.

FIG. 12 is a vertical partial component sectional view of the thermal regulator of FIG. 10 taken along line 12-12 of FIG. 10. More particularly, the placement of vertical bores 60-65 and horizontal bores 66 and 67 can clearly be seen. Placement of plugs 72 and 74 is also shown along with fluid disrupter plugs 70. Bores 78 receive fasteners 68 (see FIG. 11) to secure housing 76 of cooling unit 48 to frame leg 38 of frame 36 in thermally conductive relation. Inlet fitting 50 and outlet fitting 52 span a serpentine cooling channel 78 within housing 76 through which cooling (or heating) fluid is pumped responsive to the control system and a fluid pump (not shown) from a fluid source, or reservoir.

Figure 13:
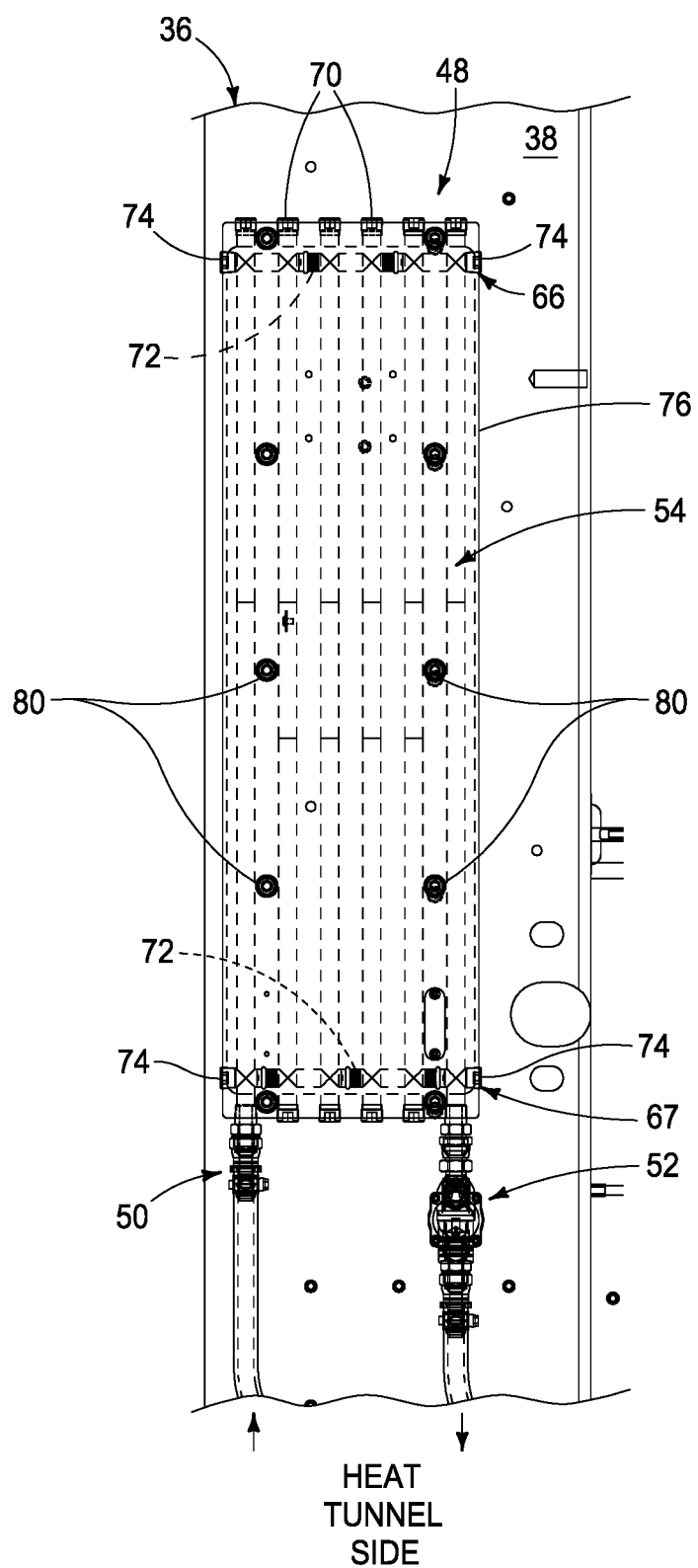
FIG. 13 is a vertical partial component view of the thermal regulator mounted to a component of the frame taken along line 13-13 of FIG. 10.

FIG. 13 is a vertical partial component view of the thermal regulator mounted to a component of the frame taken along line 13-13 of FIG. 10. FIG. 13 is a vertical partial component view of a thermal regulator or cooling unit 48 mounted to a component, or leg 38 of the frame 36 taken along line 11-11 of FIG. 10. Cooling fluid, or water enters the cooling channel 54 in housing 76 via inlet line 50, routes through an undulating, or folded, U-shaped cooling channel 54 in cooling unit 48, and exits via outlet line 52. Fluid disrupter plugs 70 induce turbulent flow to increase heat transfer with housing 76, while plugs 72 and 74 in bores 66 and 67 define the flow path. Bores 80 facilitate assembly of housing 76 to frame member 38.

Figure 14:
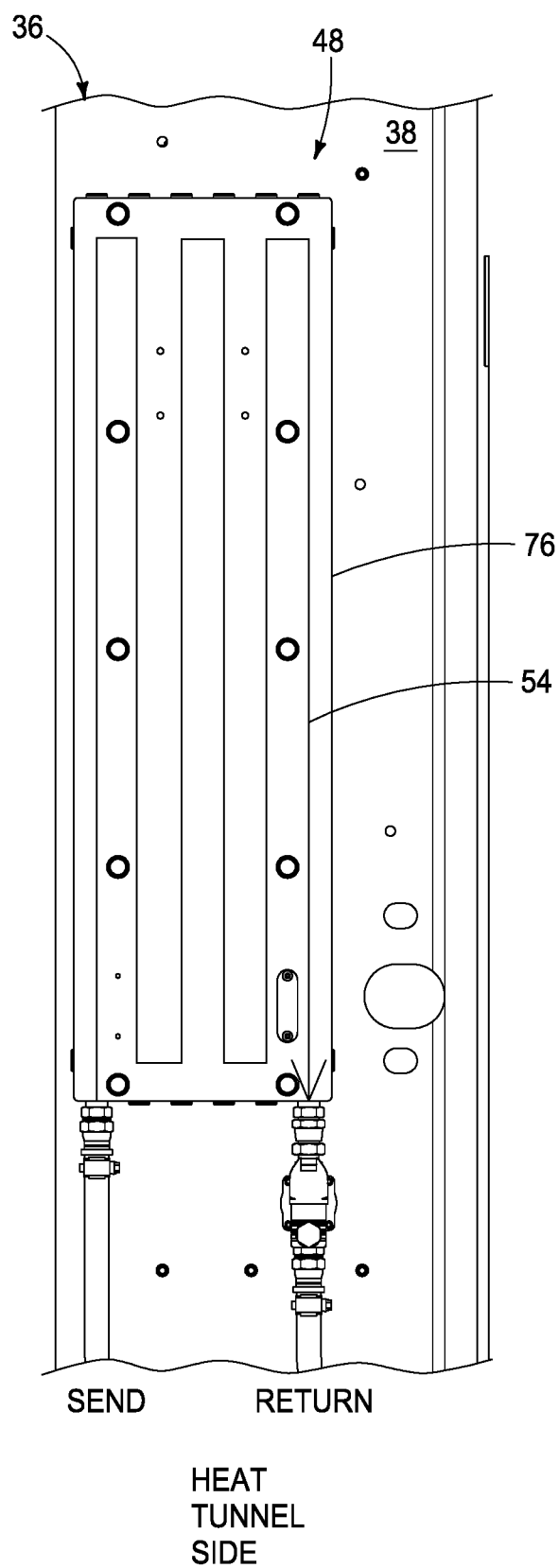
FIG. 14 is a diagrammatic vertical partial component view of the thermal regulator mounted to a component of the frame taken along line 14-14 of FIG. 10.

FIG. 14 is a diagrammatic vertical partial component view of the thermal regulator mounted to a component of the frame taken along line 14-14 of FIG. 10. More particularly, housing 76 of cooling unit 48 is affixed to frame leg 38 of frame 36 to transfer cooling or heating to frame member 38.

Figure 15:
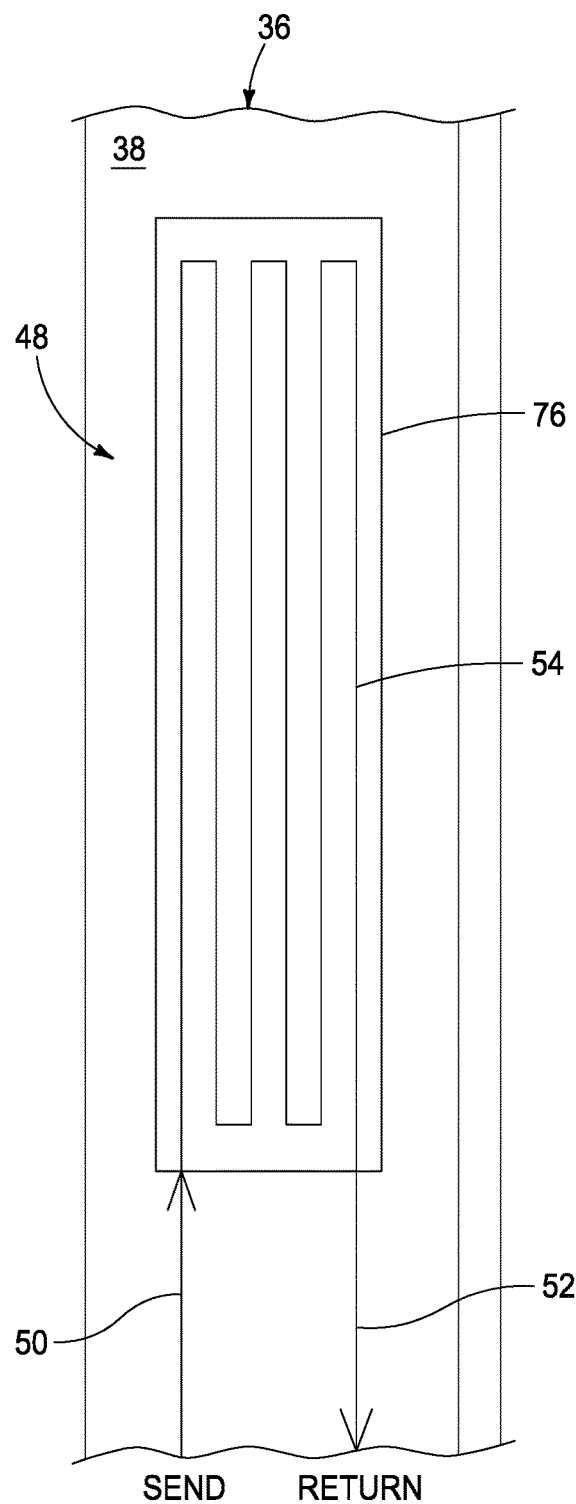
FIG. 15 is a diagrammatic vertical partial component view of the thermal regulator and mounted to a component of the frame showing the fluid flow path and taken along line 15-15 of FIG. 10.

FIG. 15 is a diagrammatic vertical partial component view of the thermal regulator and mounted to a component of the frame showing the fluid flow path and taken along line 15-15 of FIG. 10. FIG. 15 is a vertical partial component view of a thermal regulator in the form of a cooling unit 48 affixed in thermally conductive relation, or mounted to a component, or leg 38 of frame 36 taken along line 11-11 of FIG. 10. Cooling channel, or circuit 54 is formed in housing 76 between inlet (or inlet fitting) 50 and outlet (or outlet fitting) 52.

Figure 16:
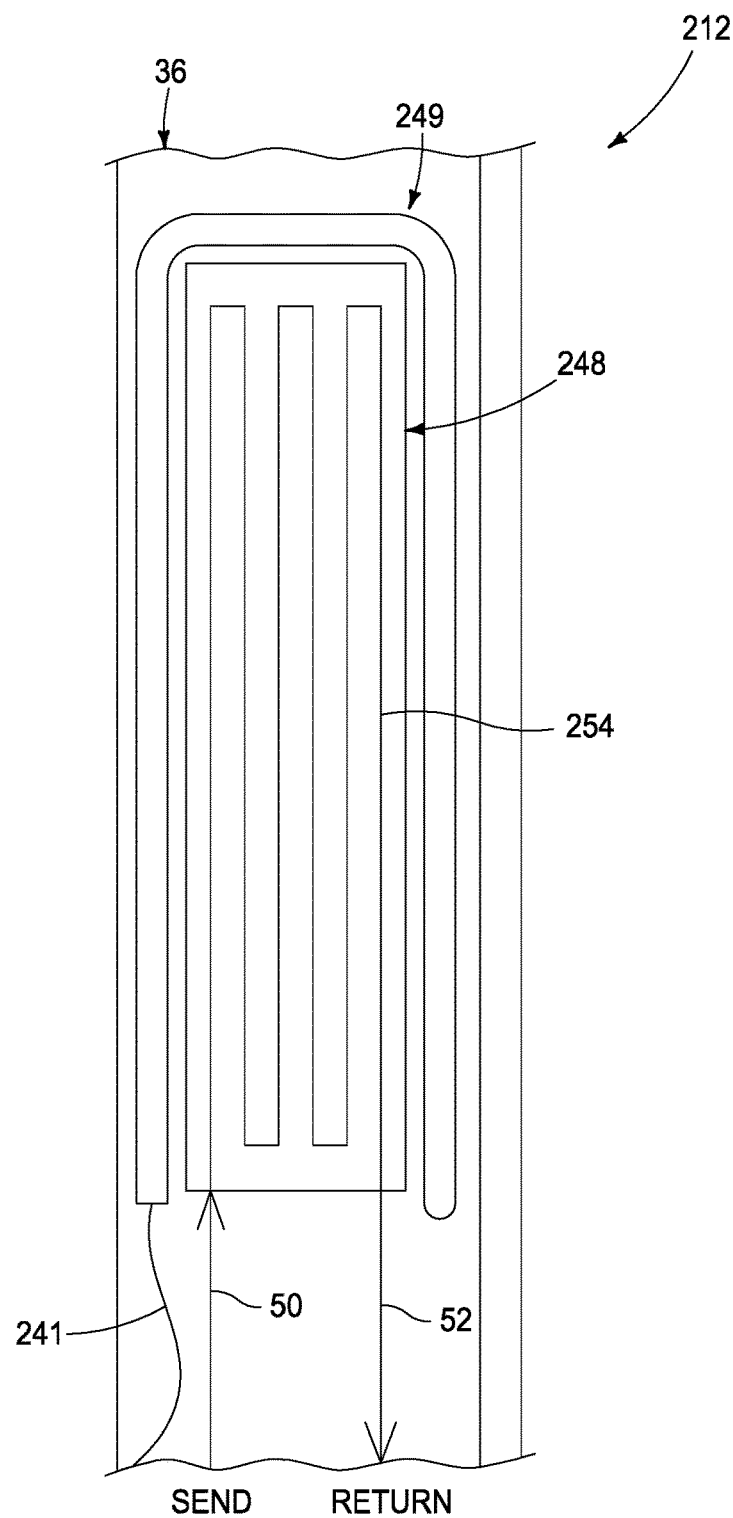
FIG. 16 is a diagrammatic vertical partial component view of the thermal regulator capable of heating and/or cooling and mounted to a component of the frame and showing the fluid flow path and taken along line 16-16 of FIG. 10.

FIG. 16 is a diagrammatic vertical partial component view of a thermal regulator 248 capable of heating and/or cooling and mounted to a component, or frame leg of frame 38 and showing the fluid flow path 254 and taken along line 16-16 of FIG. 10. Heating and cooling unit 248 is a cooling unit just like unit 48, but also includes an electrical rod heating sub unit 249 mounted in thermally conductive relation to a component, or leg of the frame 36 taken along line 11-11 of FIG. 10. Heating unit 249 is a U-shaped electric heater rod with an electrical supply line 241, while cooling unit 248 is an undulating, or reversing, U-shaped cooling fluid channel 254 having a cooling fluid inlet line 50 and an outlet line 52. In one case, heating unit 249 can be affixed onto the housing of unit 248. Optionally, unit 249 can be affixed directly onto frame 36 adjacent to unit 248. In this way, a combination of heat and or cooling can be applied selectively between legs (or other components) of a thermoforming frame in order to realize a more dimensionally stable frame geometry when subjected to temperature gradients across the structure, as well as changes in temperature during the day and evening, or even season.

While the subject matter of this application was motivated in addressing flatness and sealing between die plates when forming using high forming loads, such as loads generated when using forming pressure, or air to help form articles during a thermoforming operation, it is in no way so limited. The disclosure is only limited by the accompanying claims as literally worded, without interpretative or other limiting reference to the specification, and in accordance with the doctrine of equivalents.

The terms "a", "an", and "the" as used in the claims herein are used in conformance with long-standing claim drafting practice and not in a limiting way. Unless specifically set forth herein, the terms "a", "an", and "the" are not limited to one of such elements, but instead mean "at least one".

In compliance with the statute, the various embodiments have been described in language more or less specific as to structural and methodical features. It is to be understood, however, that the various embodiments are not limited to the specific features shown and described, since the means herein disclosed comprise disclosures of putting the various embodiments into effect. The various embodiments are, therefore, claimed in any of its forms or modifications within the proper scope of the appended claims appropriately interpreted in accordance with the doctrine of equivalents.

What is claimed is:

1. A thermoforming machine, comprising:
   at least one frame member; and
   a thermal regulator in heat transfer relation with one of the at least one frame member configured to control temperature of the one frame member to mitigate thermal deformation of the frame member.

2. The thermoforming machine of claim 1, wherein the thermal regulator is configured to regulate temperature of the frame member to mitigate at least one of thermal expansion and thermal contraction of the frame member.

3. The thermoforming machine of claim 1, wherein at least one frame member comprises a first frame member and a second frame member, the first frame member positioned in a thermoforming line proximate a heat source and the second frame member positioned in the thermoforming line distal the heat source, the thermal regulator configured in thermal communication with the first frame member to cool the first frame member proximate a temperature of the second frame member to mitigate thermal deformation between the first frame member and the second frame member.

4. The thermoforming machine of claim 1, wherein the thermal regulator comprises a fluid cooling circuit affixed in heat transfer relation with the one frame member.

5. The thermoforming machine of claim 4, wherein the fluid cooling circuit comprises a housing having a thermal mass, the fluid cooling circuit configured to traverse a circuitous route through the housing.

6. The thermoforming machine of claim 5, wherein the fluid cooling circuit is a bore extending in a folded, extending and returning pattern within the body forming an array of substantially parallel flow pathways.

7. The thermoforming machine of claim 6, wherein a turbulence flow strip is interposed in at least one of the flow pathways.

8. The thermoforming machine of claim 7, wherein turbulence flow strip is a central baffle having at least one undulating flow-deflecting surface.

9. The thermoforming machine of claim 1, wherein each flow path comprises a cylindrical bore and the at least one undulating flow-deflecting surface is provide by a cylindrical plug-mounted baffle extending centrally down the cylindrical bore.

10. The thermoforming machine of claim 1, further comprising a controller having processing circuitry and memory, and a valve for regulating fluid flow through the thermal regulator configured to receive output control signals to regulate fluid flow through the thermal regulator.

11. The thermoforming machine of claim 10, wherein the valve comprises an outlet line valve.

12. A thermoforming machine, comprising:
    a frame having a plurality of spaced-apart frames members; and
    a thermal regulator in heat transfer relation with one of the plurality of frame members configured to control temperature of the one frame member of a pair of spaced-apart frame members to mitigate thermal deformation of the frame member between the pair of frame members.

13. The thermoforming machine of claim 12, wherein each frame member comprises a corner vertical portion of the frame having an angular horizontal cross-section.

14. The thermoforming machine of claim 12, wherein the thermal regulator is configured to regulate temperature of the frame member to mitigate at least one of thermal expansion and thermal contraction of the frame member.

15. The thermoforming machine of claim 12, wherein the thermal regulator comprises a fluid cooling circuit affixed in heat transfer relation with the one frame member.

16. The thermoforming machine of claim 15, wherein the fluid cooling circuit is a bore extending in a folded, extending and returning pattern within a body of the thermal regulator and forming an array of substantially parallel flow pathways.

17. The thermoforming machine of claim 16, wherein a turbulence flow strip is interposed in at least one of the flow pathways.

18. The thermoforming machine of claim 12, further comprising a controller having processing circuitry and memory, and a valve for regulating fluid flow through the thermal regulator configured to receive output control signals to regulate fluid flow through the thermal regulator.

19. The thermoforming machine of claim 18, wherein the valve comprises a fluid outlet line valve in fluid communication with the thermal regulator.

* * * * *